(12) United States Patent
Goleski et al.

(10) Patent No.: US 9,175,748 B2
(45) Date of Patent: Nov. 3, 2015

(54) MULTI-SPEED TRANSMISSION

(71) Applicant: FORD GLOBAL TECHNOLOGIES, LLC, Dearborn, MI (US)

(72) Inventors: Gregory Daniel Goleski, Rochester Hills, MI (US); Donald Edward Hoffman, Canton, MI (US); Robert Scott Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 14/046,421

(22) Filed: Oct. 4, 2013

(65) Prior Publication Data
US 2015/0099603 A1 Apr. 9, 2015

(51) Int. Cl.
*F16H 3/62* (2006.01)

(52) U.S. Cl.
CPC .......... *F16H 3/62* (2013.01); *F16H 2200/0073* (2013.01); *F16H 2200/201* (2013.01); *F16H 2200/2012* (2013.01); *F16H 2200/2041* (2013.01)

(58) Field of Classification Search
CPC ....................................................... F16H 3/66
See application file for complete search history.

(56) References Cited

U.S. PATENT DOCUMENTS

| 6,955,627 | B2 * | 10/2005 | Thomas et al. ............... 475/283 |
| 6,960,149 | B2 | 11/2005 | Ziemer |
| 8,177,674 | B2 | 5/2012 | Baldwin |
| 8,231,496 | B2 | 7/2012 | Gumpoltsberger et al. |
| 8,303,454 | B1 * | 11/2012 | Shim et al. .................... 475/280 |
| 8,591,376 | B1 * | 11/2013 | Shim et al. .................... 475/276 |
| 8,651,996 | B2 * | 2/2014 | Mellet et al. .................. 475/276 |
| 8,788,166 | B1 * | 7/2014 | Kucharski et al. ............. 701/60 |
| 2007/0037657 | A1 * | 2/2007 | Thomas et al. ............... 475/284 |
| 2012/0196718 | A1 | 8/2012 | Hart et al. |
| 2012/0270694 | A1 * | 10/2012 | Seo et al. ...................... 475/276 |
| 2012/0302393 | A1 | 11/2012 | Seo et al. |
| 2013/0072342 | A1 * | 3/2013 | Shim et al. .................... 475/276 |
| 2014/0166422 | A1 * | 6/2014 | Goleski et al. ............... 192/48.5 |
| 2014/0248989 | A1 * | 9/2014 | Hart et al. ..................... 475/276 |
| 2014/0256499 | A1 * | 9/2014 | Lippert et al. ................ 475/275 |
| 2015/0045174 | A1 * | 2/2015 | Beck et al. .................... 475/278 |
| 2015/0087467 | A1 * | 3/2015 | Singh ............................ 475/275 |

FOREIGN PATENT DOCUMENTS

DE 10 2012 203 069 A1 * 8/2013
WO WO 2013/127548 A1 * 6/2013

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — Derek D Knight
(74) *Attorney, Agent, or Firm* — James Dottavio; Brooks Kushman P.C.

(57) ABSTRACT

A transmission gearing arrangement produces eleven forward speed ratios and one reverse speed ratio by selective engagement of three shift elements in various combinations. One embodiment includes four simple planetary gear sets, four clutches, and two brakes. Another embodiment includes two axis transfer gear pairs, three simple planetary gear sets, four clutches, and two brakes. Each of these embodiments may include a one way brake such that the first shift is non-synchronous. A third embodiment includes four simple planetary gear sets, four brakes, and two clutches.

19 Claims, 3 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

Figure 1:
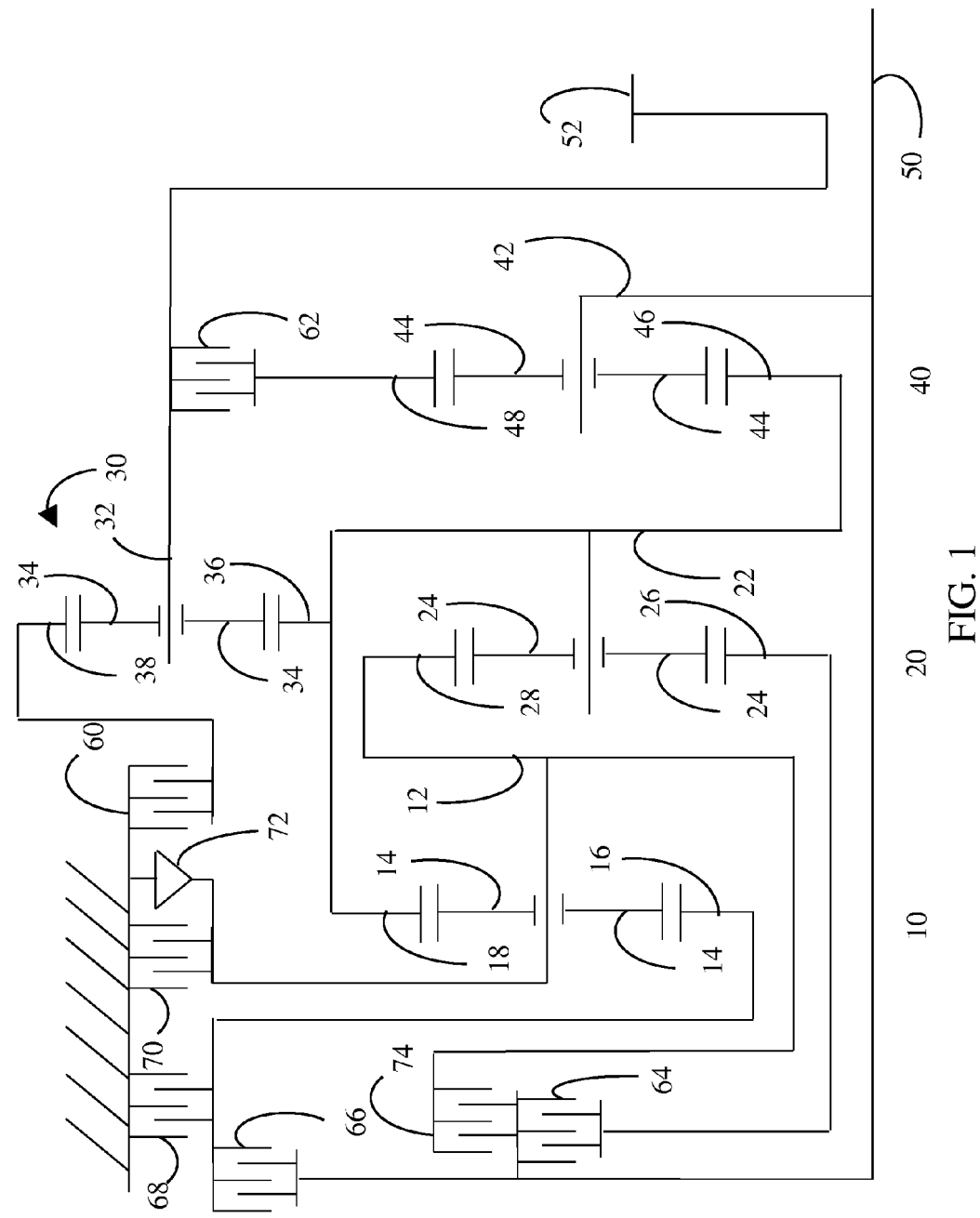
FIG. 1 is a schematic diagram of a first transmission gearing arrangement.

Four gearing arrangements impose particular speed relationships among an input, an output, and first through fifth shafts. A first gearing arrangement fixedly imposes a linear speed relationship among the first shaft, the second shaft, the third shaft, and the fourth shaft. The first gearing arrangement may be, for example, first and second simple planetary gear sets with the second sun gear as the first shaft, the first ring gear and second carrier as the second shaft, the first carrier and second ring gear as the third shaft, and the first sun gear as the fourth shaft. A second gearing arrangement selectively imposes a proportional speed relationship between the second shaft and the output. The second gearing arrangement may be, for example, a simple planetary gear set with the sun gear as the second shaft, the carrier fixedly coupled to the output, and a brake selectively coupling the ring gear to the transmission housing. Alternatively, the second gearing arrangement may be two meshing axis transfer gears, one fixedly coupled to second shaft and the other selectively coupled to the output. A third gearing arrangement fixedly imposes a linear speed relationship among the second shaft, the input, and the fifth shaft. The third gearing arrangement may be, for example, a simple planetary gear set with the sun gear as the second shaft, the carrier fixedly coupled to the input, and the ring gear as the fifth shaft. Finally, a fourth gearing arrangement selectively imposes a proportional speed relationship between the fifth shaft and the output. The fourth gearing arrangement may be, for example, a clutch that couples the fifth shaft to the output. Alternatively, the fourth gearing arrangement may be two meshing axis transfer gears, one fixedly coupled to fifth shaft and the other selectively coupled to the output. First and second brakes selectively hold the third and fourth shafts, respectively, against rotation. First and second clutches selectively couple the input to the third and fourth shafts, respectively. A third clutch may selectively couple the input to the first shaft. A one way brake may passively restrain the third shaft from rotating on one direction. A third brake may selectively hold the first shaft against rotation.

In another embodiment, four gearing arrangements impose particular speed relationships among an input, an output, and second through fifth shafts. A first gearing arrangement fixedly imposes a linear speed relationship among the second shaft, the third shaft, and the fourth shaft. The first gearing arrangement may be, for example, a simple planetary gear sets with the sun gear as the fourth shaft, the carrier as the third shaft, and the ring gear as the second shaft. A second gearing arrangement selectively imposes a proportional speed relationship between the second shaft and the output. A third gearing arrangement fixedly imposes a linear speed relationship among the second shaft, the input, and the fifth shaft. A fourth gearing arrangement selectively imposes a proportional speed relationship between the fifth shaft and the output. First and second brakes selectively hold the third and fourth shafts, respectively, against rotation. First and second clutches selectively couple the input to the third and fourth shafts, respectively. In some embodiments, a fifth gearing arrangement selectively imposes a linear speed relationship among the input, the second shaft, and the third shaft. In other embodiments, a fifth gearing arrangement selectively imposes a proportional speed relationship between the second shaft and the third shaft.

In another embodiment, three gearing arrangements impose particular speed relationships among an input, an output, and an intermediate shaft. A first gearing arrangement selectively imposes at least four positive speed ratios between the input and the intermediate shaft such that a passive shift element is engaged in the first speed ratio and overruns in the second through fourth speed ratios. A second gearing arrangement selectively imposes a proportional speed relationship between the intermediate shaft and the output. Finally, a third gearing arrangement selectively imposes a linear speed relationship among the intermediate shaft, the input, and the output.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

A gearing arrangement is a collection of shafts and shift elements configured to impose specified speed relationships among the shafts. Some speed relationships, called fixed speed relationships, are imposed regardless of the state of any shift elements. Other speed relationships, called selective speed relationships, are imposed only when particular shift elements are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

Figure 2:
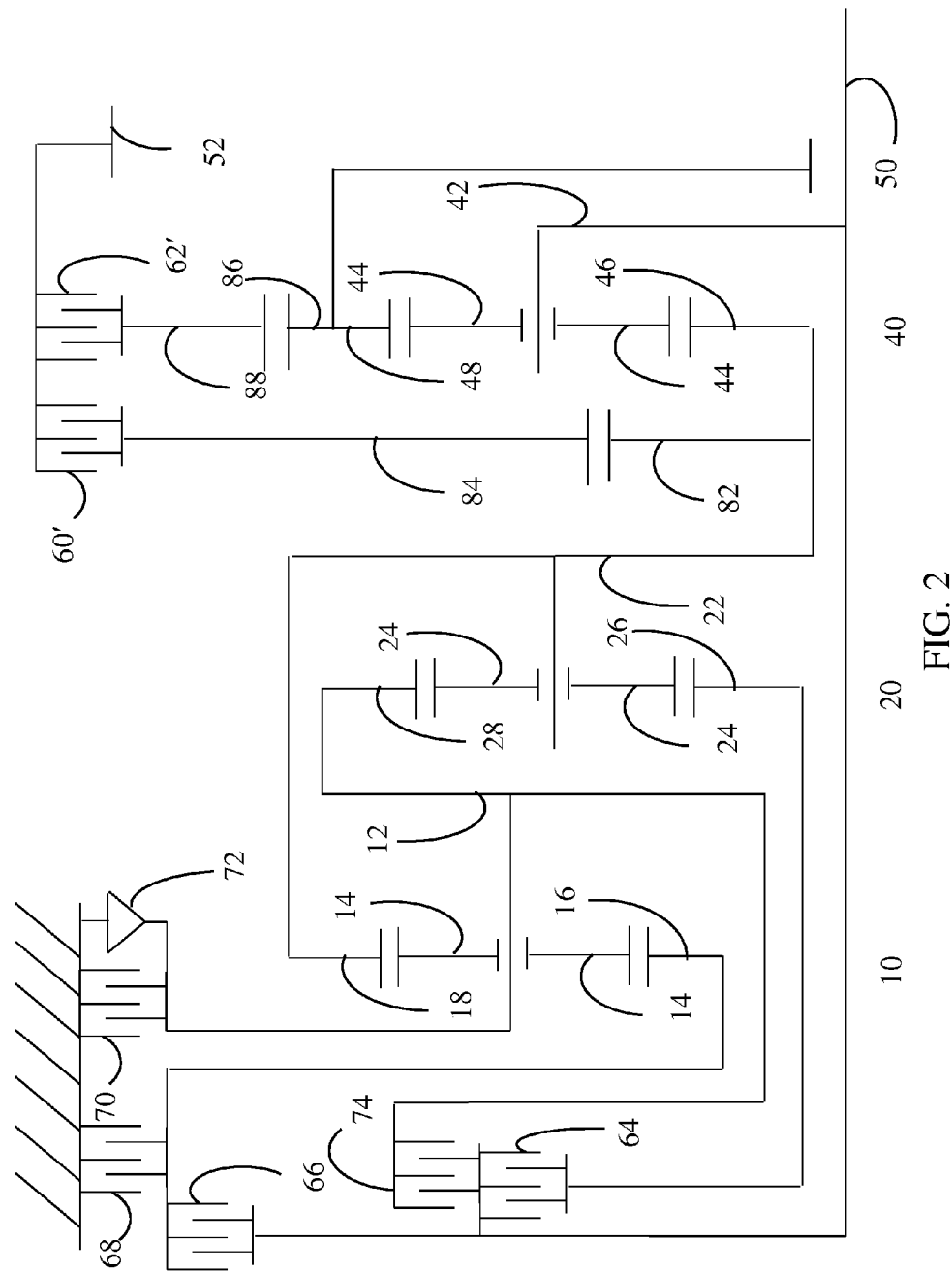
FIG. 2 is a schematic diagram of a second transmission gearing arrangement.
Figure 3:
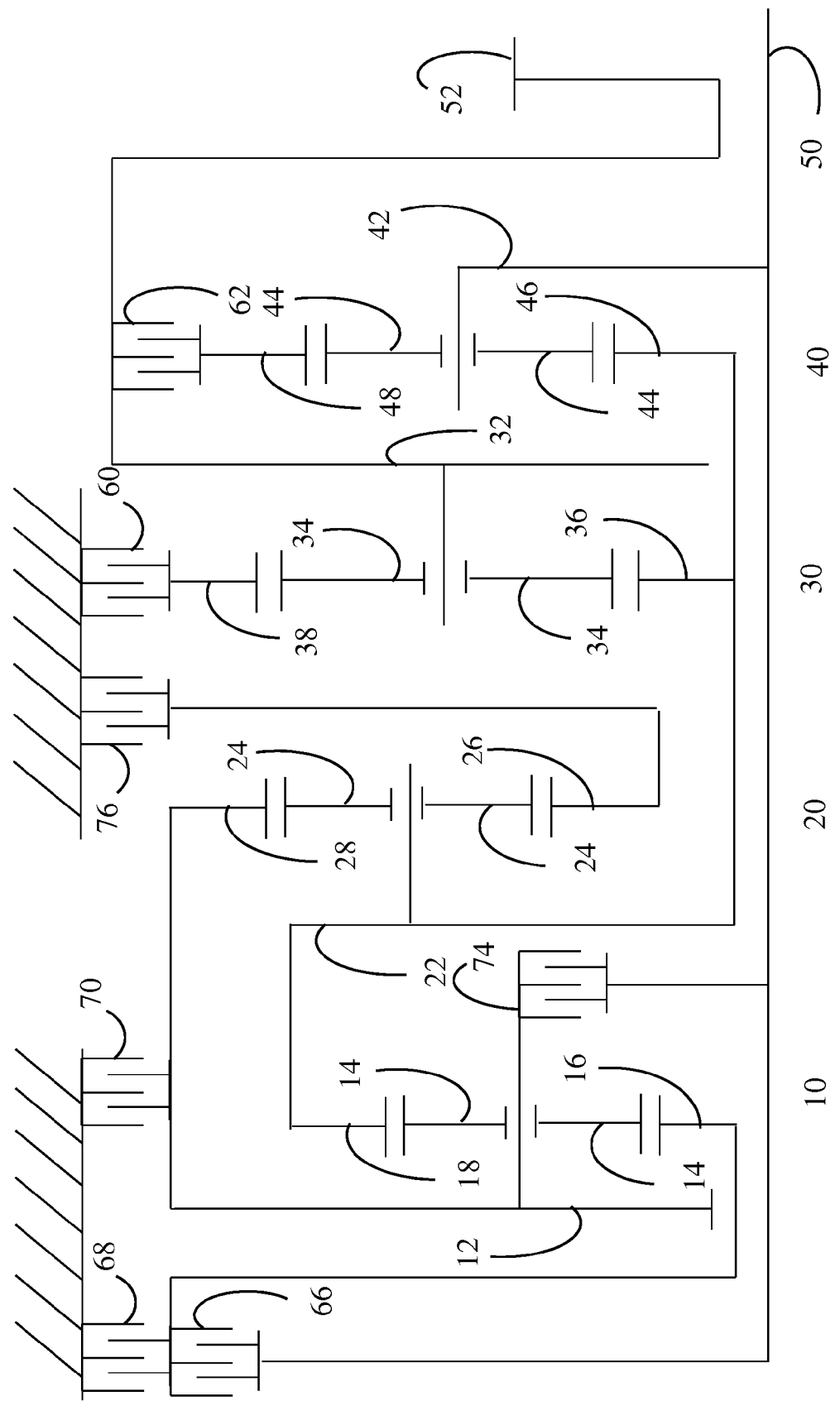
FIG. 3 is a schematic diagram of a third transmission gearing arrangement.

FIGS. 1-3 depict a transaxle that provides a variety of speed ratios between input 50 and output 52. Input 50 may be driven by an internal combustion engine or other prime mover. A launch device such as torque converter or launch clutch may be employed between the prime mover and transaxle input 50 permitting the engine to idle while the vehicle is stationary and a transaxle ratio is selected. Output 52 drives the vehicle wheels, preferably via a differential that allows a slight speed difference between left and right wheels while the vehicle goes around a corner.

In FIGS. 1 and 3, output 52 rotates about the same axis as input 50. Power may be transferred to a differential axis, parallel to the input axis, by either a chain or a series of axis transfer gears. In a longitudinal configuration, input 50 would enter from the left and output 52 would be a shaft extending to the right. In FIG. 2, output 52 rotates about an intermediate axis parallel to both the input axis and the differential axis.

The transaxle of FIG. 1 utilizes four simple planetary gear sets 10, 20, 30, and 40. A planet carrier 12 rotates about a central axis and supports a set of planet gears 14 such that the planet gears rotate with respect to the planet carrier. External gear teeth on the planet gears mesh with external gear teeth on a sun gear 16 and with internal gear teeth on a ring gear 18. The sun gear and ring gear are supported to rotate about the same axis as the carrier. Gear sets 20, 30, and 40 are similarly structured. Gear set 30 may be positioned axially beside the other gear sets. However, to reduce axial length, gear set 30 may be positioned radially outside gear sets 10 and 20 as shown in FIG. 1. A suggested ratio of gear teeth for each planetary gear set is listed in Table 1.

TABLE 1

| Ring 18/Sun 16 | 2.15 |
|---|---|
| Ring 28/Sun 26 | 1.50 |
| Ring 38/Sun 36 | 1.80 |
| Ring 48/Sun 46 | 2.00 |

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship among the sun gear, the ring gear, and the planet carrier.

Carrier 42 is fixedly coupled to input 50. Carrier 32 is fixedly coupled to output 52. Sun gear 26 forms a first shaft. Ring gear 18, carrier 22, sun gear 36, and sun gear 46 are mutually fixedly coupled and form a second shaft. Carrier 12 is fixedly coupled to ring gear 28 forming a third shaft. Sun gear 16 forms a fourth shaft. Ring gear 48 forms a fifth shaft. Finally, ring gear 38 forms a sixth shaft. Ring gear 38 is selectively held against rotation by brake 60. Output 52 is selectively coupled to ring gear 48 by clutch 62. Input 50 is selectively coupled to sun gear 26 by clutch 64. Sun gear 16 is selectively coupled to input 50 by clutch 66 and selectively held against rotation by brake 68. The combination of carrier 12 and ring gear 28 is selectively coupled to input 50 by clutch 74 and selectively held against rotation by brake 70. Optional one-way-brake 72 passively precludes the combination of carrier 12 and ring gear 28 from rotating in a negative direction while permitting rotation in the positive direction.

Various combinations of gear sets, clutches, and brakes impose particular speed relationships. The combination of gear sets 10 and 20 imposes a fixed linear speed relationship among sun gear 26, the combination of ring 18 and carrier 22, the combination of carrier 12 and ring gear 28, and sun gear 16. The combination of gear set 20 and clutch 64 selectively imposes a linear speed relationship among input 50, carrier 22, and ring gear 28. The combination of gear set 30 and brake 60 selectively imposes an underdrive relationship between sun gear 36 and output 52. The combination of gear set 40 and clutch 62 selectively imposes a linear speed relationship among sun gear 46, input 50, and output 52.

As shown in Table 2, engaging the shift elements in combinations of three establishes eleven forward speed ratios and one reverse speed ratio between input 50 and output 52. An X indicates that the shift element is required to establish the speed ratio. An (X) indicates the clutch can be applied but is not required to establish a power flow path. In 5th gear, clutches 60 and 62 establish the power flow path between input 50 and output 52. Any one of the remaining shift elements can also be applied. Applying clutch 74 ensures that all single and two step shifts from 5th gear can be accomplished by engaging only one shift element and releasing only one shift element. Establishing 3rd gear or 7th gear requires engagement of two of the three clutches 64, 66, and 74. When the gear sets have tooth numbers as indicated in Table 1, the speed ratios have the values indicated in Table 2.

TABLE 2

|     | 60 | 62 | 64 | 66 | 68 | 70/72 | 74 | Ratio | Step |
|-----|----|----|----|----|----|-------|----|-------|------|
| Rev | X  |    |    | X  |    |       | X  | −6.19 | 86%  |
| 1st | X  |    | X  |    |    |       | X  | 7.20  |      |
| 2nd | X  |    | X  |    | X  |       |    | 4.25  | 1.69 |
| 3rd | X  |    | X  |    |    |       | X  | 2.88  | 1.48 |
| 4th | X  |    |    |    | X  |       | X  | 1.97  | 1.47 |
| 5th | X  | X  |    |    |    |       | (X)| 1.63  | 1.21 |
| 6th |    | X  |    |    | X  |       | X  | 1.30  | 1.25 |
| 7th |    | X  | X  |    |    |       | X  | 1.00  | 1.30 |
| 8th |    | X  | X  |    | X  |       |    | 0.86  | 1.16 |
| 9th |    | X  | X  |    |    | X     |    | 0.77  | 1.12 |
| 10th|    | X  |    |    | X  | X     |    | 0.67  | 1.15 |
| 11th|    | X  |    | X  |    | X     |    | 0.58  | 1.16 |

A second example transaxle is illustrated in FIG. 2. This transaxle utilizes three simple planetary gear sets 10, 20, and 40, each having a sun gear, a ring gear, and a planet carrier supported for rotation about the input axis. Additionally, axis transfer gears 82 and 86 are supported for rotation about the input axis. Output gear 52 and axis transfer gears 84 and 88 are supported for rotation about the intermediate axis. Output 52 may transmit power to a differential axis through an additional gear mesh (not shown). Gear 84 is in continuous meshing engagement with gear 82 and gear 88 is in continuous meshing engagement with gear 86. A suggested ratio of gear teeth for each planetary gear set is listed in Table 3.

TABLE 3

| Ring 18/Sun 16 | 2.15 |
| Ring 28/Sun 26 | 1.50 |
| Ring 48/Sun 46 | 2.00 |
| Gear 84/Gear 82 | 2.80 |
| Gear 88/Gear 86 | 1.00 |

Carrier 42 is fixedly coupled to input 50. Sun gear 26 forms a first shaft. Ring gear 18, carrier 22, sun gear 46, and axis transfer gear 82 are mutually fixedly coupled and form a second shaft. Carrier 12 is fixedly coupled to ring gear 28 forming a third shaft. Sun gear 16 forms a fourth shaft. Ring gear 48 is fixedly coupled to axis transfer gear 86 and forms a fifth shaft. Output 52 is selectively coupled to axis transfer gear 84 by clutch 60' and selectively coupled to axis transfer gear 88 by clutch 62'. Input 50 is selectively coupled to sun gear 26 by clutch 64. Sun gear 16 is selectively coupled to input 50 by clutch 66 and selectively held against rotation by brake 68. The combination of carrier 12 and ring gear 28 is selectively coupled to input 50 by clutch 74 and selectively held against rotation by brake 70. Optional one-way-brake 72 passively precludes the combination of carrier 12 and ring gear 28 from rotating in a negative direction while permitting rotation in the positive direction.

Various combinations of gear sets, clutches, and brakes impose particular speed relationships. The combination of gear sets 10 and 20 imposes a fixed linear speed relationship among sun gear 26, the combination of ring 18 and carrier 22, the combination of carrier 12 and ring gear 28, and sun gear 16. The combination of gear set 20 and clutch 64 selectively imposes a linear speed relationship among input 50, carrier 22, and ring gear 28. The combination of axis transfer gears 82 and 84 and clutch 60' selectively imposes an underdrive relationship between axis transfer gear 82 and output 52.

Engaging the shift elements in combinations of three, as shown in Table 2, establishes eleven forward speed ratios and one reverse speed ratio between input 50 and output 52. Note that shift elements 60' and 62' of FIG. 2 are engaged in the same speed ratios as shift elements 60 and 62 of FIG. 1. When the gear sets have tooth numbers as indicated in Table 3, the speed ratios have the values indicated in Table 2.

The transaxle of FIG. 3 utilizes four simple planetary gear sets 10, 20, 30, and 40. A suggested ratio of gear teeth for each planetary gear set is listed in Table 4.

TABLE 4

| Ring 18/Sun 16 | 2.20 |
| Ring 28/Sun 26 | 2.20 |
| Ring 38/Sun 36 | 1.80 |
| Ring 48/Sun 46 | 2.00 |

Carrier 42 is fixedly coupled to input 50. Carrier 32 is fixedly coupled to output 52. Sun gear 26 forms a first shaft. Ring gear 18, carrier 22, sun gear 36, and sun gear 46 are mutually fixedly coupled and form a second shaft. Carrier 12 is fixedly coupled to ring gear 28 forming a third shaft. Sun gear 16 forms a fourth shaft. Ring gear 48 forms a fifth shaft. Finally, ring gear 38 forms a sixth shaft. Ring gear 38 is selectively held against rotation by brake 60. Output 52 is selectively coupled to ring gear 48 by clutch 62. Sun gear 26 is selectively held against rotation by brake 76. Sun gear 16 is selectively coupled to input 50 by clutch 66 and selectively held against rotation by brake 68. The combination of carrier 12 and ring gear 28 is selectively coupled to input 50 by clutch 74 and selectively held against rotation by brake 70.

Various combinations of gear sets, clutches, and brakes impose particular speed relationships. The combination of gear sets 10 and 20 imposes a fixed linear speed relationship among sun gear 26, the combination of ring 18 and carrier 22, the combination of carrier 12 and ring gear 28, and sun gear 16. The combination of gear set 20 and brake 76 selectively imposes an underdrive speed relationship between ring gear 28 and carrier 22. The combination of gear set 30 and brake 60 selectively imposes an underdrive relationship between sun gear 36 and output 52. The combination of gear set 40 and clutch 62 selectively imposes a linear speed relationship among sun gear 46, input 50, and output 52.

As shown in Table 5, engaging the shift elements in combinations of three establishes eleven forward speed ratios and one reverse speed ratio between input 50 and output 52. When the gear sets have tooth numbers as indicated in Table 4, the speed ratios have the values indicated in Table 5.

TABLE 5

|     | 60 | 62 | 66 | 68 | 70 | 74 | 76 | Ratio | Step |
|-----|----|----|----|----|----|----|----|-------|------|
| Rev | X  |    | X  |    | X  |    |    | −6.16 | 90%  |
| 1st | X  |    | X  |    |    |    | X  | 6.88  |      |
| 2nd | X  |    |    |    |    | X  | X  | 4.07  | 1.69 |
| 3rd | X  |    | X  |    |    | X  |    | 2.80  | 1.46 |
| 4th | X  |    |    | X  |    | X  |    | 1.93  | 1.46 |
| 5th | X  | X  |    |    |    | (X)|    | 1.60  | 1.20 |
| 6th |    | X  |    | X  |    | X  |    | 1.29  | 1.24 |
| 7th |    | X  | X  |    |    | X  |    | 1.00  | 1.29 |
| 8th |    | X  |    |    |    | X  | X  | 0.87  | 1.16 |
| 9th |    | X  | X  |    |    |    | X  | 0.77  | 1.12 |
| 10th|    | X  |    |    | X  |    | X  | 0.67  | 1.16 |
| 11th|    | X  | X  |    | X  |    |    | 0.58  | 1.15 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input;
   an output;
   first, second, third, fourth, and fifth shafts;
   a first gearing arrangement configured to impose a first fixed linear speed relationship among the first shaft, the second shaft, the third shaft, and the fourth shaft;
   a second gearing arrangement configured to impose a first selective proportional speed relationship between the second shaft and the output;
   a third gearing arrangement configured to impose a second fixed linear speed relationship among the second shaft, the input, and the fifth shaft;
   a fourth gearing arrangement configured to impose a second selective proportional speed relationship between the fifth shaft and the output;
   a first brake configured to selectively hold the third shaft against rotation;
   a second brake configured to selectively hold the fourth shaft against rotation;
   a first clutch configured to selectively couple the input to the third shaft; and
   a second clutch configured to selectively couple the input to the fourth shaft.

2. The transmission of claim 1 further comprising:
   a third clutch configured to selectively couple the input to the first shaft.

3. The transmission of claim 2 further comprising:
   a one way brake configured to passively restrain the third shaft from rotating in one direction while permitting rotation in the opposite direction.

4. The transmission of claim 1 further comprising:
   a third brake configured to selectively hold the first shaft against rotation.

5. The transmission of claim 1 wherein the first gearing arrangement comprises:
   a first simple planetary gear set having a first sun gear fixedly coupled to the fourth shaft, a first ring gear fixedly coupled to the second shaft, a first planet carrier fixedly coupled to the third shaft, and a first plurality of planet gears each supported for rotation with respect to the first planet carrier and in continuous meshing engagement with both the first sun gear and the first ring gear; and
   a second simple planetary gear set having a second sun gear fixedly coupled to the first shaft, a second ring gear fixedly coupled to the third shaft, second planet carrier fixedly coupled to the second shaft, and a second plural-ity of planet gears each supported for rotation with respect to the second planet carrier and in continuous meshing engagement with both the second sun gear and the second ring gear.

6. The transmission of claim 1 wherein the second gearing arrangement comprises:
   a simple planetary gear set having a sun gear fixedly coupled to the second shaft, a ring gear, a planet carrier fixedly coupled to the output, and a plurality of planet gears each supported for rotation with respect to the planet carrier and in continuous meshing engagement with both the sun gear and the ring gear; and
   a third brake configured to selectively hold the ring gear against rotation.

7. The transmission of claim 1 wherein the second gearing arrangement comprises:
   a first axis transfer gear fixedly coupled to the second shaft;
   a second axis transfer gear in continuous meshing engagement with the first axis transfer gear; and
   a fourth clutch configured to selectively couple the second axis transfer gear to the output.

8. The transmission of claim 1 wherein the third gearing arrangement comprises:
   a simple planetary gear set having a sun gear fixedly coupled to the second shaft, a ring gear fixedly coupled to the fifth shaft, a planet carrier fixedly coupled to the input, and a plurality of planet gears each supported for rotation with respect to the planet carrier and in continuous meshing engagement with both the sun gear and the ring gear.

9. The transmission of claim 1 wherein the fourth gearing arrangement comprises:
   a fifth clutch configured to selectively couple the fifth shaft to the output.

10. The transmission of claim 1 wherein the fourth gearing arrangement comprises:
    a third axis transfer gear fixedly coupled to the fifth shaft;
    a fourth axis transfer gear in continuous meshing engagement with the third axis transfer gear; and
    a fifth clutch configured to selectively couple the fourth axis transfer gear to the output.

11. A transmission comprising:
    an input;
    an output;
    first, second, third, and fourth shafts;
    a first gearing arrangement configured to impose a first fixed linear speed relationship among the first shaft, the second shaft, and the third shaft;
    a second gearing arrangement configured to impose a first selective proportional speed relationship between the first shaft and the output;
    a third gearing arrangement configured to impose a second fixed linear speed relationship among the first shaft, the input, and the fourth shaft;
    a fourth gearing arrangement configured to impose a second selective proportional speed relationship between the fourth shaft and the output;
    a first brake configured to selectively hold the second shaft against rotation;
    a second brake configured to selectively hold the third shaft against rotation;
    a first clutch configured to selectively couple the input to the second shaft; and
    a second clutch configured to selectively couple the input to the third shaft.

12. The transmission of claim 11 further comprising:
a fifth gearing arrangement configured to selectively impose a linear speed relationship among the input, the first shaft, and the second shaft.

13. The transmission of claim 12 wherein the fifth gearing arrangement comprises:
a simple planetary gear set having a sun gear, a ring gear fixedly coupled to the second shaft, a planet carrier fixedly coupled to the first shaft, and a plurality of planet gears each supported for rotation with respect to the planet carrier and in continuous meshing engagement with both the sun gear and the ring gear; and
a third clutch configured to selectively couple the input to the sun gear.

14. The transmission of claim 12 further comprising:
a one way brake configured to passively restrain the second shaft from rotating in one direction while permitting rotation in the opposite direction.

15. The transmission of claim 11 further comprising:
a fifth gearing arrangement configured to selectively impose a proportional speed relationship between the first shaft and the second shaft.

16. The transmission of claim 15 wherein the fifth gearing arrangement comprises:
a simple planetary gear set having a sun gear, a ring gear fixedly coupled to the second shaft, a planet carrier fixedly coupled to the first shaft, and a plurality of planet gears each supported for rotation with respect to the planet carrier and in continuous meshing engagement with both the sun gear and the ring gear; and
a third brake configured to selectively hold the sun gear against rotation.

17. The transmission of claim 11 wherein the first gearing arrangement comprises:
a simple planetary gear set having a sun gear fixedly coupled to the third shaft, a ring gear fixedly coupled to the first shaft, a planet carrier fixedly coupled to the second shaft, and a plurality of planet gears each supported for rotation with respect to the planet carrier and in continuous meshing engagement with both the sun gear and the ring gear.

18. A transmission comprising:
an input;
an output;
an intermediate shaft;
a first gearing arrangement configured to selectively impose at least four distinct positive proportional speed ratios between the input and the intermediate shaft, the first gearing arrangement comprising a passive shift element that engages to transmit torque from the input to the intermediate shaft in a highest of the positive proportional speed ratios and overruns in a remainder of the positive proportional speed ratios;
a first simple planetary gear set having a first sun gear fixedly coupled to the intermediate shaft, a first ring gear selectively held against rotation, a first planet carrier fixedly coupled to the output shaft, and a first plurality of planet gears each supported for rotation with respect to the first planet carrier and in continuous meshing engagement with both the first sun gear and the first ring gear; and
a second simple planetary gear set having a second sun gear fixedly coupled to the intermediate shaft, a second ring gear selectively coupled to the output shaft, a second planet carrier fixedly coupled to the input shaft, and a second plurality of planet gears each supported for rotation with respect to the second planet carrier and in continuous meshing engagement with both the second sun gear and the second ring gear.

19. The transmission of claim 18 wherein the first gearing arrangement comprises:
the intermediate shaft;
first, second, and third shafts;
a gearing arrangement configured to fixedly impose a linear speed relationship among the first shaft, the intermediate shaft, the second shaft, and the third shaft;
a first brake configured to selectively hold the second shaft against rotation;
a second brake configured to selectively hold the third shaft against rotation;
a first clutch configured to selectively couple the input to the second shaft;
a second clutch configured to selectively couple the input to the third shaft;
a third clutch configured to selectively couple the input to the first shaft; and
a one way brake configured to passively restrain the second shaft from rotating in one direction while permitting rotation in the opposite direction.

* * * * *